US012694395B2

(12) United States Patent
      Kim

(10) Patent No.:   US 12,694,395 B2
(45) Date of Patent:      Jul. 28, 2026

(54) METHOD AND SYSTEM FOR CONTROLLING CARD ISSUANCE

(71) Applicant: TRAVEL-WALLET CO., LTD., Seoul (KR)

(72) Inventor: Hyung Woo Kim, Seoul (KR)

(73) Assignee: TRAVEL-WALLET CO., LTD., Seoul (KR)

( * ) Notice: Subject to any disclaimer, the term of this patent is extended or adjusted under 35 U.S.C. 154(b) by 0 days.

(21) Appl. No.: 19/288,903

(22) Filed: Aug. 1, 2025

(65) Prior Publication Data

US 2026/0037955 A1    Feb. 5, 2026

(30) Foreign Application Priority Data

Aug. 2, 2024    (KR) ........................ 10-2024-0102829
Aug. 30, 2024   (KR) ........................ 10-2024-0117690

(51) Int. Cl.
    *G06Q 20/34*      (2012.01)
    *G06Q 40/03*      (2023.01)
(52) U.S. Cl.
    CPC ......... *G06Q 20/354* (2013.01); *G06Q 40/033* (2025.08)
(58) Field of Classification Search
    CPC ........................... G06Q 20/354; G06Q 40/033
    See application file for complete search history.

(56) References Cited

U.S. PATENT DOCUMENTS

| | | | | |
|---|---|---|---|---|
| 6,625,582 B2* | 9/2003 | Richman | ................ | G06Q 40/06 |
| | | | | 705/35 |
| 2002/0088852 A1* | 7/2002 | Ohta | ........................ | G07F 17/42 |
| | | | | 235/381 |
| 2015/0317619 A1* | 11/2015 | Curtis | .................. | G06Q 20/108 |
| | | | | 705/14.37 |
| 2019/0122205 A1* | 4/2019 | Jeong | ................... | G06Q 20/322 |

FOREIGN PATENT DOCUMENTS

| | | | | |
|---|---|---|---|---|
| CA | 2251689 C | * | 9/2007 | ............. H04L 9/083 |
| KR | 10-2501114 | | 2/2023 | |

OTHER PUBLICATIONS

Office Action dated Nov. 21, 2024 for Korean Patent Application No. 10-2024-0117690 and its English translation provided by Applicant's foreign counsel.
Notice of Allowance dated May 29, 2025 for Korean Patent Application No. 10-2024-0117690 and its English translation provided by Applicant's foreign counsel.

* cited by examiner

*Primary Examiner* — Asha Puttaiah
(74) *Attorney, Agent, or Firm* — WOMBLE BOND DICKINSON (US) LLP

(57) ABSTRACT

A system for controlling card issuance and a method therefor may be provided, wherein the method comprises: a card management server receiving a card issuance application from a user's electronic device; a card issuing apparatus requesting and receiving authentication data in response to a request; the apparatus generating an authentication code based on the data and displaying the code; the electronic (Continued)

device recognizing the code and performing verification with the server; the apparatus requesting and receiving an authentication result; and in response to authentication completion, the apparatus generating a card by writing information onto a provisional card and issuing the card. The present disclosure can improve the convenience, promptness, efficiency, and/or reliability of card issuance.

16 Claims, 10 Drawing Sheets

—301

307

METHOD AND SYSTEM FOR CONTROLLING CARD ISSUANCE

CROSS-REFERENCE TO RELATED APPLICATION

This application claims priority to Korean Patent Application No. 10-2024-0102829, filed on Aug. 2, 2024, and Korean Patent Application No. 10-2024-0117690, filed on Aug. 30, 2024, the disclosures of which are hereby incorporated by reference in their entirety.

BACKGROUND

Technical Field

The embodiments of the present disclosure relate generally to card issuance technology, and more particularly, to a method and system for controlling card issuance.

Technical Considerations

Due to their convenience, the use of cards (e.g., credit cards, prepaid cards, debit cards, etc.) for financial transactions, such as payments and cash withdrawals, is increasing among users. Such cards may be issued in various ways. For example, a user may visit a branch of a card company or an affiliated location to have a card issued and received. As another example, a user may apply for a card through the Internet or by a phone call and have the card delivered via a courier service.

However, conventional methods of card issuance can cause inconvenience for the user. For instance, the user may be inconvenienced by having to personally visit a branch or an affiliated location for card issuance. Furthermore, card delivery typically takes a considerable amount of time (e.g., two to ten days). As a result, the user faces the inconvenience of being unable to use the card until it is delivered.

SUMMARY

Embodiments of the present disclosure provide a method and system for controlling card issuance, having improved convenience, promptness, efficiency, and/or reliability in card issuance.

Technical problems to be solved by the present invention are not limited to the above-mentioned problems, and other technical problems not described above will be clearly understood by those skilled in the art from the following description.

To achieve the above advantages, according to some non-limiting embodiments of the present disclosure, there is provided a method for controlling card issuance, which comprises the steps of: receiving, by a card management server, from an electronic device of a user, an application for card issuance via a card issuing apparatus; in response to an input of a card issuance request at the card issuing apparatus, requesting and receiving, by the card issuing apparatus, authentication data from the card management server via an issuing apparatus management server, by the card issuing apparatus, generating an authentication code based on the received authentication data, and displaying the generated authentication code on a display; by the electronic device, recognizing the displayed authentication code, transmitting a verification request for the card issuance to the card management server, and receiving a verification result from the card management server, in response to a request to proceed to a next step, requesting and receiving, by the card issuing apparatus, an authentication result for the card issuance from the card management server via the issuing apparatus management server, and in response to a completion of authentication for the card issuance, by the card issuing apparatus, writing and printing card information of the applied—for card onto a pre-stocked blank provisional card to thereby generate a card, and issuing the generated card, wherein the step of requesting and receiving of the authentication data comprises: transmitting, by the card issuing apparatus, to the card management server via the issuing apparatus management server, the request for the authentication data along with an identification code of the card issuing apparatus, the identification code comprising geographical location information of the card issuing apparatus; and in response to receiving the request, by the card management server, generating the authentication data that includes the identification code comprising the geographical location information of the card issuing apparatus, an authentication number, and an expiration time, and transmitting the generated authentication data to the card issuing apparatus via the issuing apparatus management server.

In some non-limiting embodiments or aspects, the method may further comprise: by the electronic device, in response to recognizing the authentication code, performing a user authentication.

In some non-limiting embodiments or aspects, the step of recognizing the displayed authentication code may comprise: extracting, by the electronic device, the authentication number and the identification code from the authentication code; the step of transmitting the verification request may comprise: transmitting, by the electronic device, the extracted authentication number and the extracted identification code to the card management server, and the step of receiving the verification result may comprise: by the card management server, in response to receiving the verification request, generating issuance data related to the applied—for card, and storing the generated issuance data; by the card management server, transmitting the verification result for the card issuance to the electronic device; and by the electronic device, receiving the verification result from the card management server.

In some non-limiting embodiments or aspects, the method may further comprise: by the card management server, after transmitting the verification result, transmitting the request to proceed to the next step to the card issuing apparatus.

In some non-limiting embodiments or aspects, the step of requesting and receiving the authentication result may comprise: by the card issuing apparatus, transmitting the request for the authentication result comprising the authentication number and the identification code to the card management server via the issuing apparatus management server, by the card management server, in response to receiving the request for the authentication result, selecting issuance data based on the authentication number and the identification code; and by the card management server, transmitting the authentication result comprising the selected issuance data, the authentication number, and the identification code, to the card issuing apparatus via the issuing apparatus management server.

In some non-limiting embodiments or aspects, the step of issuing the card may comprise: discharging the generated card through an outlet; and confirming whether the discharged card has been retrieved.

In some non-limiting embodiments or aspects, the method may further comprise: by the card issuing apparatus, transmitting information regarding whether the card issuance is successful to the card management server via the issuing apparatus management server, and by the card management server, transmitting the information regarding whether the card issuance is successful to the electronic device.

In some non-limiting embodiments or aspects, the step of transmitting the information regarding whether the card issuance is successful may comprise, when the card issuance is successful and the issued card is retrieved by the user: by the card issuing apparatus, transmitting a completion of the card issuance to the card management server via the issuing apparatus management server, and by the card management server, notifying the electronic device of the completion of the card issuance and a request to register the issued card for use.

In some non-limiting embodiments or aspects, the step of transmitting the information regarding whether the card issuance is successful may comprise, when the card issuance is successful and the issued card is not retrieved by the user: by the card issuing apparatus, transmitting the non-retrieval of the issued card to the card management server via the issuing apparatus management server, and by the card management server, setting the issued card as lost, and notifying the electronic device that the issued card was not retrieved and has been marked as lost.

In some non-limiting embodiments or aspects, the method may further comprise: upon a failure of the card issuance, notifying of the card issuance failure via the electronic device.

To achieve the above advantages, according to some non-limiting embodiments of the present disclosure, there is provided a system for controlling card issuance, which comprises: an electronic device; a card management server, a card issuing apparatus; and an issuing apparatus management server, wherein the card management server is configured to: receive, from the electronic device, an application for card issuance via the card issuing apparatus; receive, from the card issuing apparatus via the issuing apparatus management server, a request for transmission of authentication data; transmit the authentication data to the card issuing apparatus via the issuing apparatus management server, receive, from the electronic device, a verification request for the card issuance; transmit a verification result to the electronic device; receive, from the card issuing apparatus via the issuing apparatus management server, a request for transmission of an authentication result for the card issuance; and transmit the authentication result to the card issuing apparatus via the issuing apparatus management server, wherein the card issuing apparatus is configured to: in response to an input of a card issuance request by a user, request and receive the authentication data from the card management server via the issuing apparatus management server, generate an authentication code based on the received authentication data, and display the generated authentication code on a display; in response to a request to proceed to a next step, request and receive the authentication result for the card issuance from the card management server via the issuing apparatus management server, and in response to a completion of authentication for the card issuance, generate a card by writing and printing card information of the applied—for card onto a pre-stocked blank provisional card, and issue the generated card, and wherein the electronic device is configured to: transmit, to the card management server, the application for card issuance via the card issuing apparatus; recognize the authentication code displayed on the card issuing apparatus; transmit the verification request for the card issuance to the card management server, and receive the verification result from the card management server, wherein the card issuing apparatus is further configured to transmit, to the card management server, the request for the authentication data along with an identification code of the card issuing apparatus, the identification code comprising geographical location information of the card issuing apparatus, and wherein the card management server is further configured to, in response to receiving the request, generate the authentication data that includes the identification code comprising the geographical location information of the card issuing apparatus, an authentication number, and an expiration time, and transmit the generated authentication data to the card issuing apparatus.

In some non-limiting embodiments or aspects, the electronic device may be further configured to: in response to recognizing the authentication code, perform a user authentication.

In some non-limiting embodiments or aspects, the electronic device may be configured to: extract the authentication number and the identification code from the authentication code; and transmit the extracted authentication number and the extracted identification code to the card management server, and the card management server may be configured to: in response to receiving the verification request, generate issuance data related to the applied—for card, and store the generated issuance data; and transmit the verification result to the electronic device.

In some non-limiting embodiments or aspects, the card management server may be further configured to: after transmitting the verification result, transmit the request to proceed to the next step to the card issuing apparatus.

In some non-limiting embodiments or aspects, the card issuing apparatus may be configured to: transmit the request for the authentication result comprising the authentication number and the identification code to the card management server, and the card management server may be configured to: in response to receiving the request for the authentication result, select issuance data based on the authentication number and the identification code; and transmit the authentication result comprising the selected issuance data, the authentication number, and the identification code to the card issuing apparatus.

In some non-limiting embodiments or aspects, the card issuing apparatus may be configured to: discharge the generated card through an outlet; and confirm whether the discharged card has been retrieved.

In some non-limiting embodiments or aspects, the card issuing apparatus may be configured to transmit information regarding whether the card issuance is successful to the card management server, and the card management server may be configured to transmit the transmitted information regarding whether the card issuance is successful to the electronic device.

To achieve the above advantages, according to some non-limiting embodiments of the present disclosure, there is provided a method for controlling card issuance, which comprises the steps of: by a card management server, receiving, from an electronic device of a user, an application for card issuance via a card issuing apparatus; by the card management server, receiving, from the card issuing apparatus, a request for authentication data required for generating an authentication code, along with an identification code of the card issuing apparatus, the identification code comprising geographical location information of the card issuing apparatus; by the card management server, generating the authentication data that includes the identification code comprising the geographical location information of the card issuing apparatus, an authentication number, and an expiration time, and transmitting the generated authentication data to the card issuing apparatus; by the card management server, receiving, from the electronic device, a verification request for card issuance based on the authentication code displayed on the card issuing apparatus, the verification request being based on the authentication data; by the card management server, transmitting a verification result to the electronic device; by the card management server, receiving, from the card issuing apparatus, a request for transmission of an authentication result for the card issuance; by the card management server, transmitting the authentication result to the card issuing apparatus; by the card issuing apparatus, in response to the authentication result, generating a card by writing and printing card information of the applied—for card onto a pre-stocked blank provisional card; and upon issuance of the generated card by the card issuing apparatus, receiving, by the card management server, from the card issuing apparatus, information regarding whether the card issuance is successful.

In some non-limiting embodiments, the present disclosure can improve user convenience by enhancing the convenience, promptness, efficiency, and/or reliability of card issuance. For example, a user can have a card issued promptly and conveniently through a kiosk located near the user. Furthermore, a user can have a card issued efficiently and securely through a user authentication process linked with the user's electronic device (e.g., a smartphone).

These and other features and characteristics of the embodiments of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and may not limit the subject matter of the present disclosure.

BRIEF DESCRIPTION OF THE DRAWINGS

The above and other objects, features and other advantages of the embodiments of the present disclosure will be more clearly understood from the following detailed description taken in conjunction with the accompanying drawings, in which.

DETAILED DESCRIPTION

Figure 1:
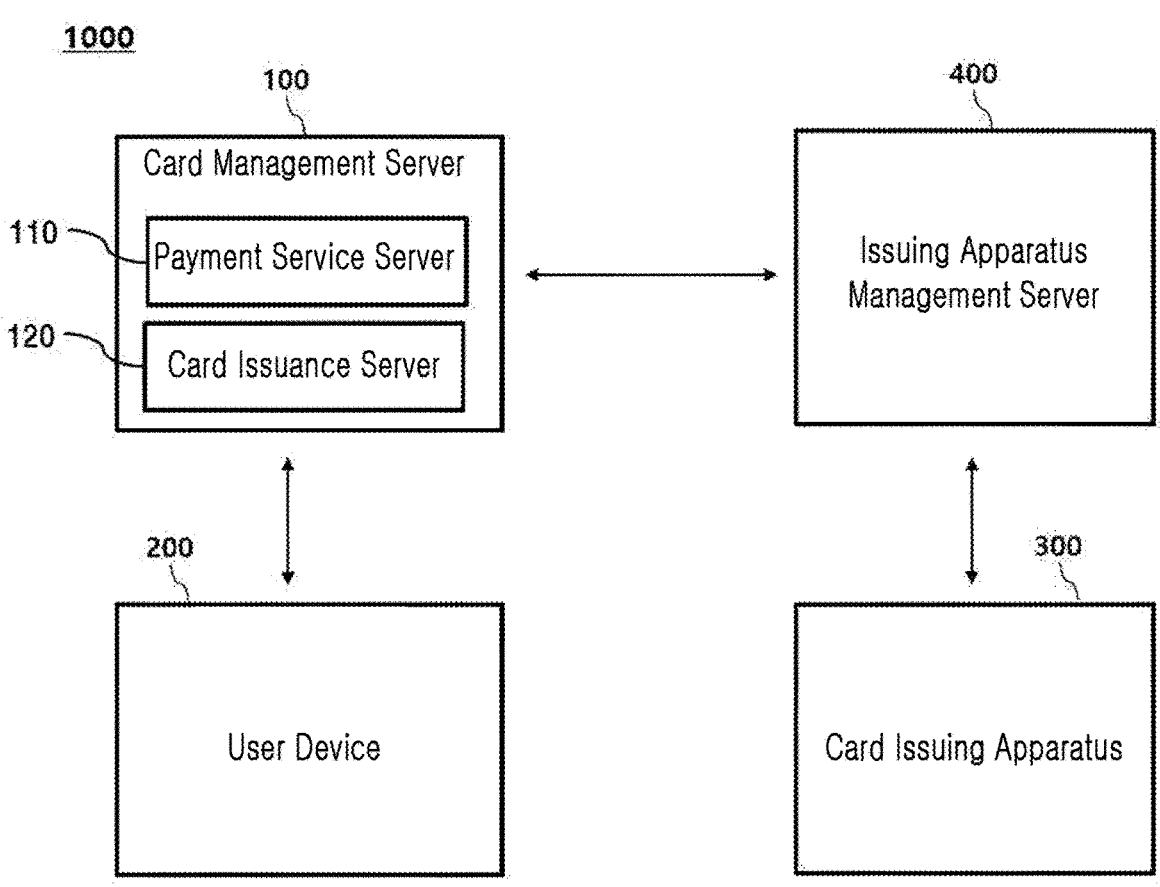
FIG. 1 is a diagram illustrating a configuration of a system for controlling card issuance according to an embodiment of the present disclosure.

Hereinafter, embodiments of the present disclosure will be described in detail with reference to the accompanying drawings. However, since various changes may be made in the embodiments, the scope of the present disclosure is not limited or restricted by these embodiments. It should be understood that all modifications, equivalents, and alternatives for the embodiments are included in the scope of the present disclosure. For example, it is to be understood that the embodiments of the present disclosure include various alternative variations and step sequences, except where expressly specified to the contrary. It is also to be understood that the specific devices and processes illustrated in the attached drawings, and described in the following detailed description, are simply illustrative and describe non-limiting embodiments of the disclosed subject matter. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "comprise", "comprises", "comprising", "include", "includes", "including", "has," "have," "having" or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments, refer to a condition for automatically triggering an action (e.g., a specific operation of an electronic device, such as a computing device, a processor, and/or the like).

It will be understood that when a component is described to as being "connected," "combined" or "coupled" to another component, the component may be directly connected or coupled to the another component, or it may be "connected," "combined" or "coupled" to the other component by an intervening other component that may be present.

Further, in describing the components of the embodiment, the meaning of "or" may mean each of the components, may mean two or more of the components, or may mean all of the components. For example, it should be understood that the expressions "a, b or c" represent any one of "a," "b," "c," "a and b," "a and c," "b and c," and "a, b and c."

Components comprised in one embodiment and components comprising common functions will be described using the same names in other embodiments. The description given in one embodiment may be applied to other embodiments, and therefore will not be described in detail within the overlapping range, unless there is a description opposite thereto.

The device and/or 'data' processed by the device may be expressed in terms of 'information''. Here, the information may be used as a concept comprising the data.

FIG. 1 is a diagram illustrating a configuration of a system for controlling card issuance according to an embodiment of the present disclosure.

Referring to FIG. 1, a system for controlling card issuance (hereinafter, card issuance system) 1000 according to an embodiment of the present disclosure may support a card issuance service for online or offline payment (or split payment). The card issuance system 1000 may include a card management server 100, a user device (hereinafter, electronic device) 200, a card issuing apparatus 300, and an issuing apparatus management server 400.

The card management server 100 may support various services related to cards. For example, the card management server 100 may support payment (or split payment) services online or offline. In addition, the card management server 100 may support an issuance (or reissuance) service for a card for payment. In other words, the card management server 100 may include a payment service server 110 and a card issuance server 120. Furthermore, the card management server 100 may store information of service subscribers (e.g., information of at least one payment card held by a subscriber, charging account information, etc.) in a database.

According to an embodiment, the card management server 100 may support card issuance through the card issuing apparatus 300. The card management server 100 may be connected with the electronic device 200 and the issuing apparatus management server 400 through a wired or wireless network. For example, the card management server 100 may receive, from the electronic device 200, an application for card issuance via the card issuing apparatus 300, receive, from the card issuing apparatus 300 via the issuing apparatus management server 400, a request for transmission of authentication data, transmit the authentication data to the card issuing apparatus 300 via the issuing apparatus management server 400, receive, from the electronic device 200, a verification request for the card issuance, transmit a verification result to the electronic device 200, receive, from the card issuing apparatus 300 via the issuing apparatus management server 400, a request for transmission of an authentication result for the card issuance, and transmit the authentication result to the card issuing apparatus 300 via the issuing apparatus management server 400. The operation method of the card management server 100 for the aforementioned card issuance will be described later with reference to FIGS. 2 to 3I.

The electronic device 200 may include an online/offline payment function. The electronic device may be, for example, a smartphone, a smartwatch, etc. The electronic device 200 may include (e.g., have installed) an app (e.g., an electronic wallet, a mobile card, etc.) that manages/controls the payment function. According to an embodiment, the electronic device 200 may transmit, to the card management server 100, an application for card issuance via the card issuing apparatus 300, recognize an authentication code displayed on the card issuing apparatus 300, transmit a verification request for the card issuance to the card management server 100, and receive a verification result from the card management server 100. Furthermore, the electronic device 200 may receive card issuance information (information regarding whether the card issuance is successful) from the card management server 100. The detailed operations of the electronic device 200 for the card issuance will be described later with reference to FIGS. 2 to 3I.

The card issuing apparatus 300 may be a kiosk that provides various services. According to an embodiment, the card issuing apparatus 300 may, in response to an input of a card issuance request by a user, request and receive authentication data from the card management server 100 via the issuing apparatus management server 400. In addition, the card issuing apparatus 300 may generate an authentication code based on the received authentication data and display the generated authentication code on a display. In addition, the card issuing apparatus 300 may, in response to a request to proceed to a next step, request and receive an authentication result for the card issuance from the card management server 100 via the issuing apparatus management server 400. In addition, the card issuing apparatus 300 may, in response to a completion of authentication for the card issuance, generate a card by storing (e.g., writing card information in the memory of an IC chip) and printing card information related to the applied—for card on a pre-stocked provisional card (e.g., a blank card on which no information is stored (or written) in an integrated-circuit (IC) chip (e.g., the memory of the IC chip)), and issue the generated card. According to an embodiment, the card issuing apparatus 300, although not illustrated, may include a storage box that stores a plurality of provisional cards, an outlet that discharges cards, and a writing module that stores (or writes) card information on an IC chip. The detailed operations of the card issuing apparatus 300 for the card issuance will be described later with reference to FIGS. 2 to 3I.

The issuing apparatus management server 400 may support various services of the card issuing apparatus 300. According to an embodiment, the issuing apparatus management server 400 may control communication between the card issuing apparatus 300 and the card management server 100 for card issuance.

Figure 2:
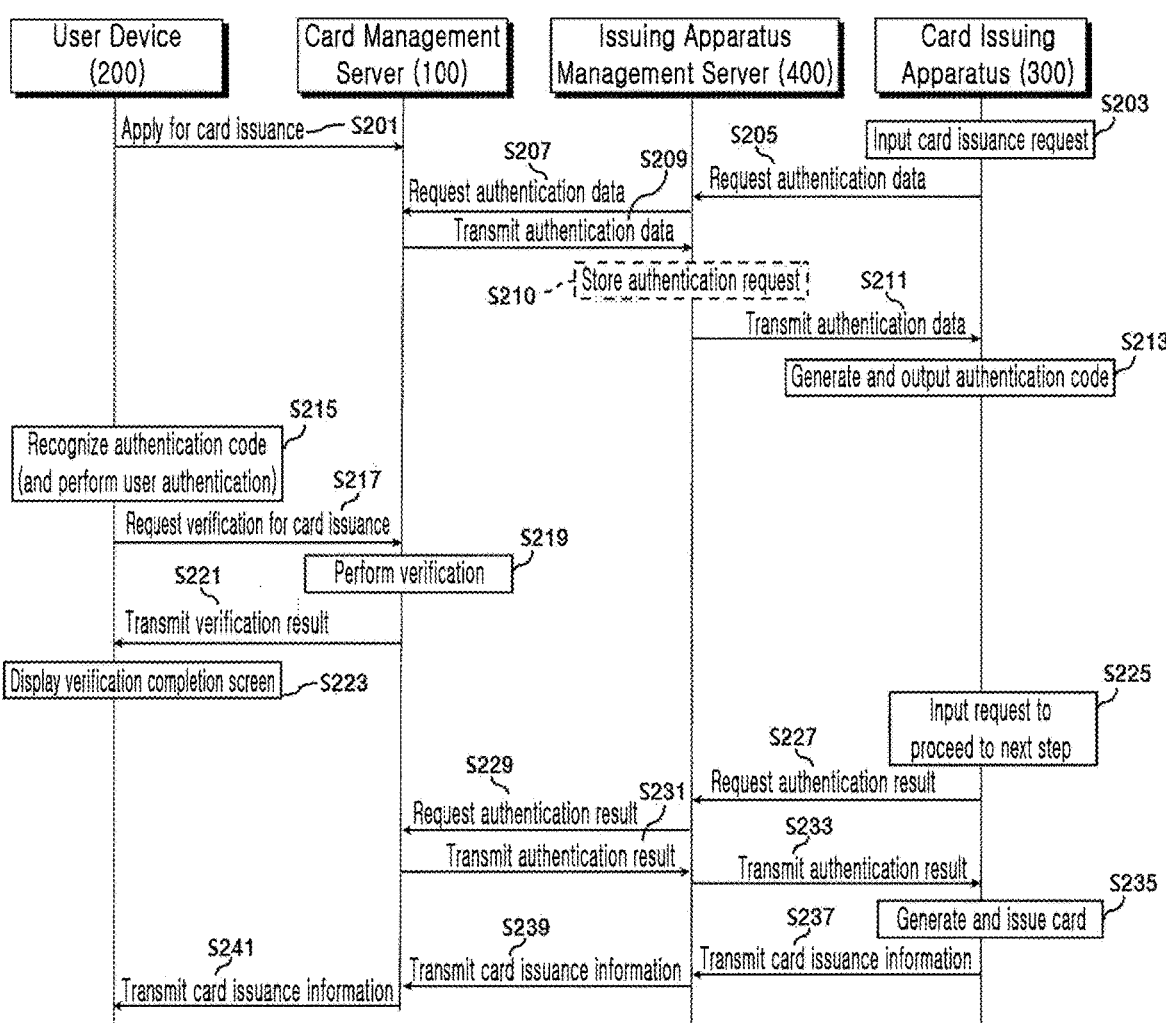
FIG. 2 is a flowchart illustrating a method for controlling card issuance of a card issuance system according to an embodiment of the present disclosure.
Figure 3A:
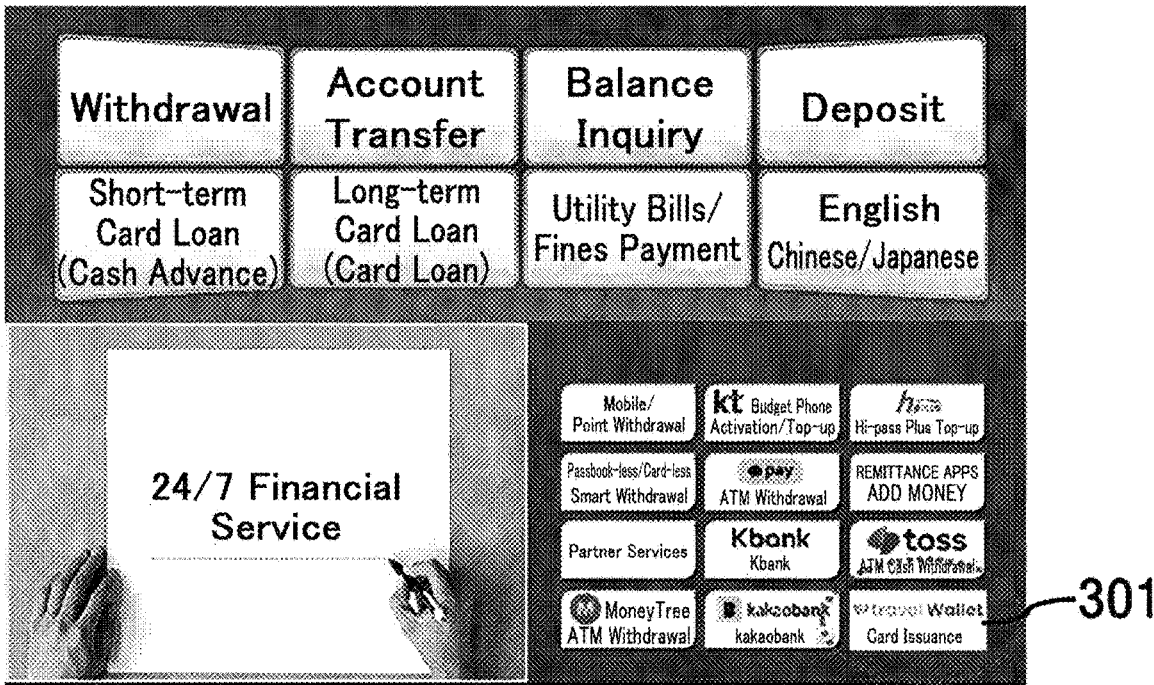
FIG. 3A is a diagram illustrating an example of an initial screen of a card issuing apparatus according to an embodiment of the present disclosure.
Figure 3B:
FIG. 3B is a diagram illustrating an example of a screen for providing an authentication code of a card issuing apparatus according to an embodiment of the present disclosure.
Figure 3C:
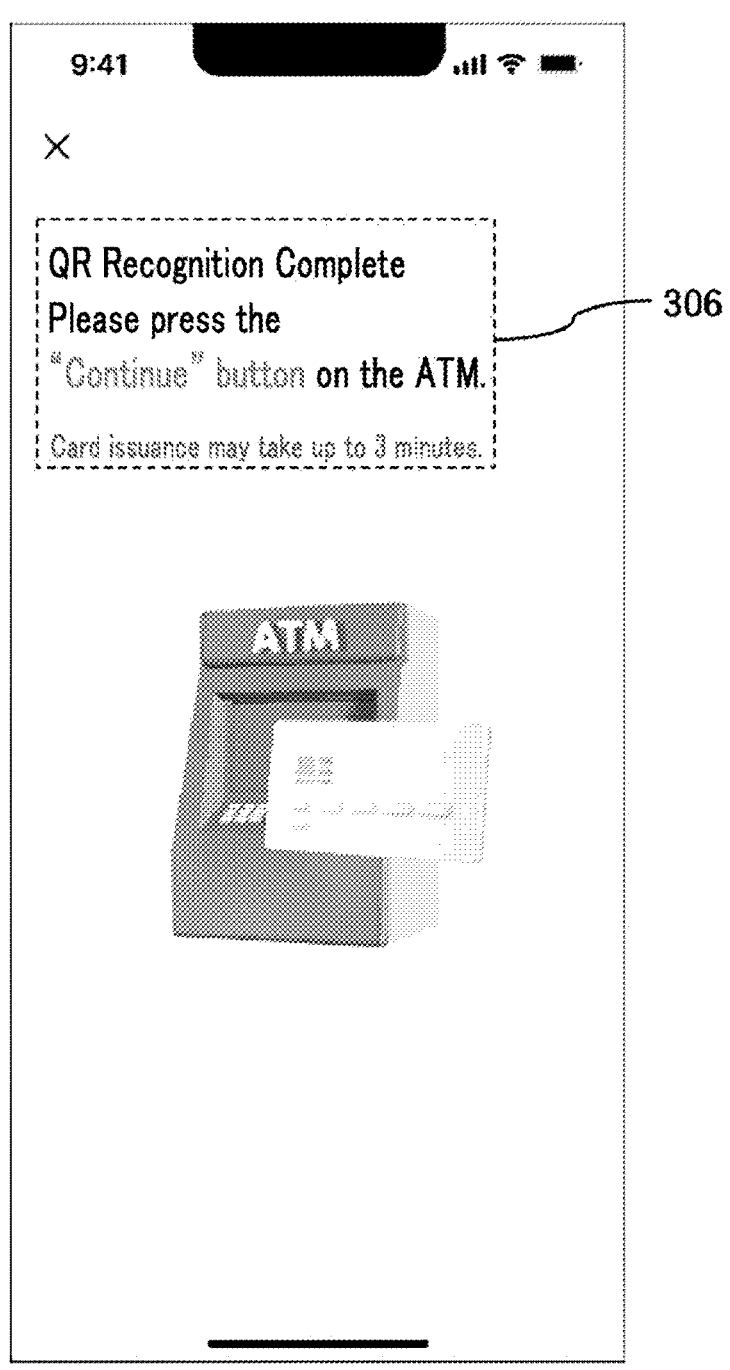
FIG. 3C is a diagram illustrating an example of a screen for indicating a verification completion of an electronic device according to an embodiment of the present disclosure.
Figure 3D:
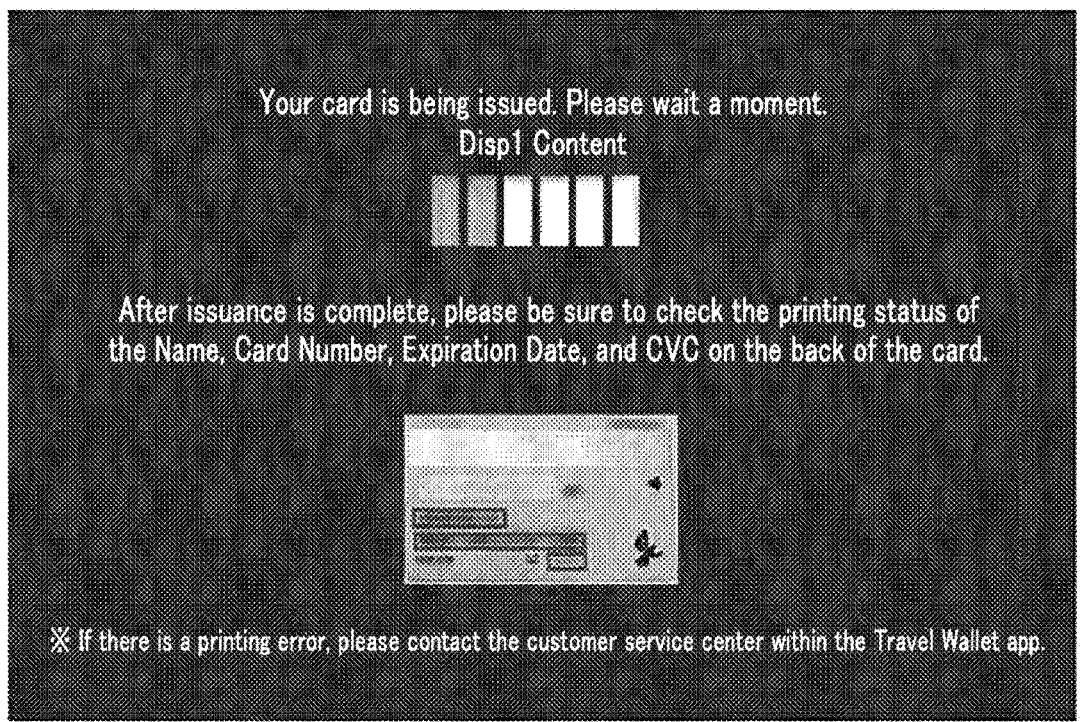
FIG. 3D is a diagram illustrating an example of a screen for indicating that a card is being issued by a card issuing apparatus according to an embodiment of the present disclosure.
Figure 3E:
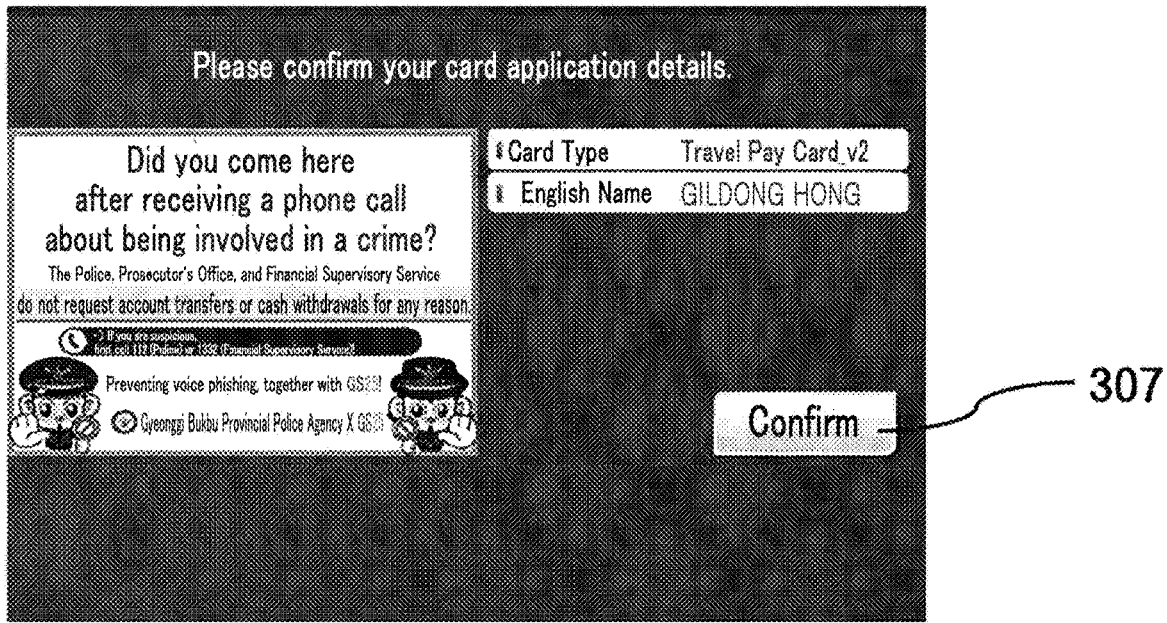
FIG. 3E is a diagram illustrating an example of a screen for providing issued card information of a card issuing apparatus according to an embodiment of the present disclosure.
Figure 3F:
FIG. 3F is a diagram illustrating an example of a screen for indicating a completion of card issuance of a card issuing apparatus according to an embodiment of the present disclosure.
Figure 3G:
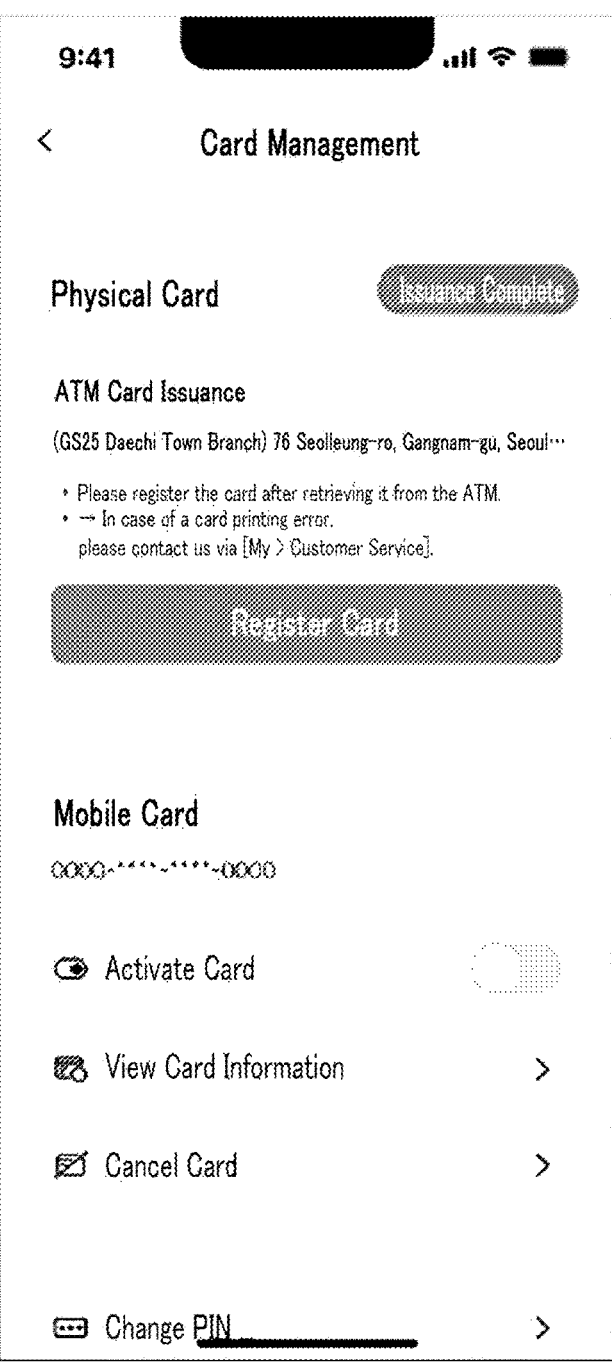
FIG. 3G is a diagram illustrating an example of a screen for indicating a completion of card issuance of an electronic device according to an embodiment of the present disclosure.
Figure 3H:
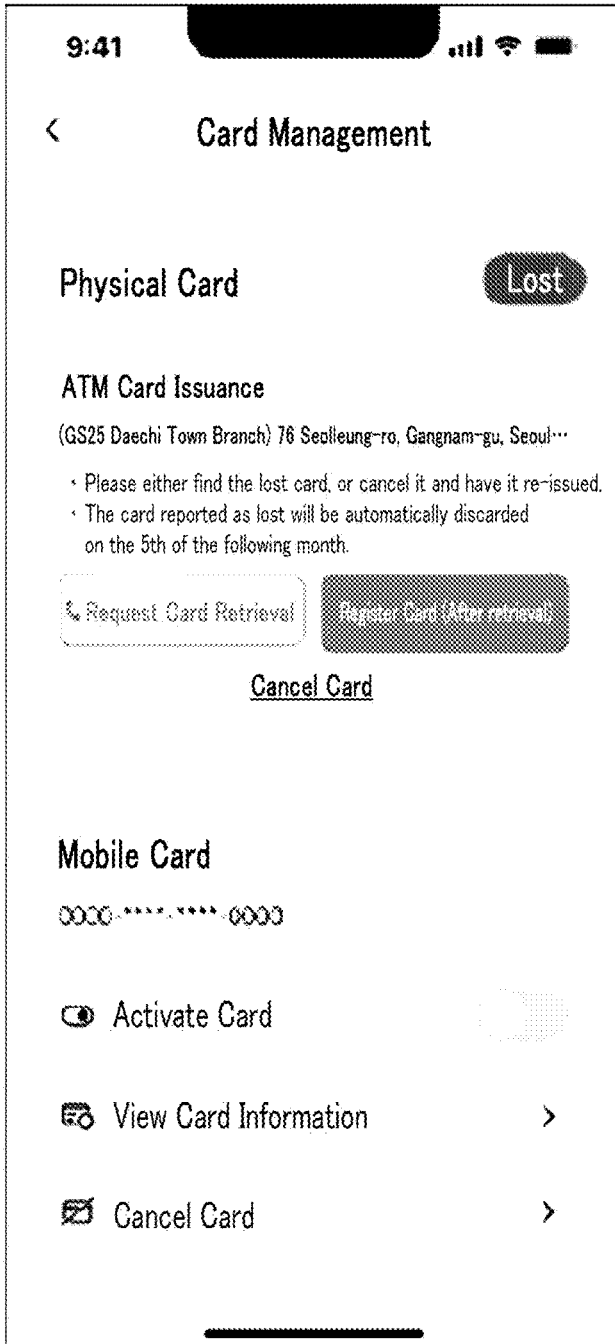
FIG. 3H is a diagram illustrating an example of a screen for indicating a non-retrieval of an issued card of an electronic device according to an embodiment of the present disclosure.
Figure 3I:
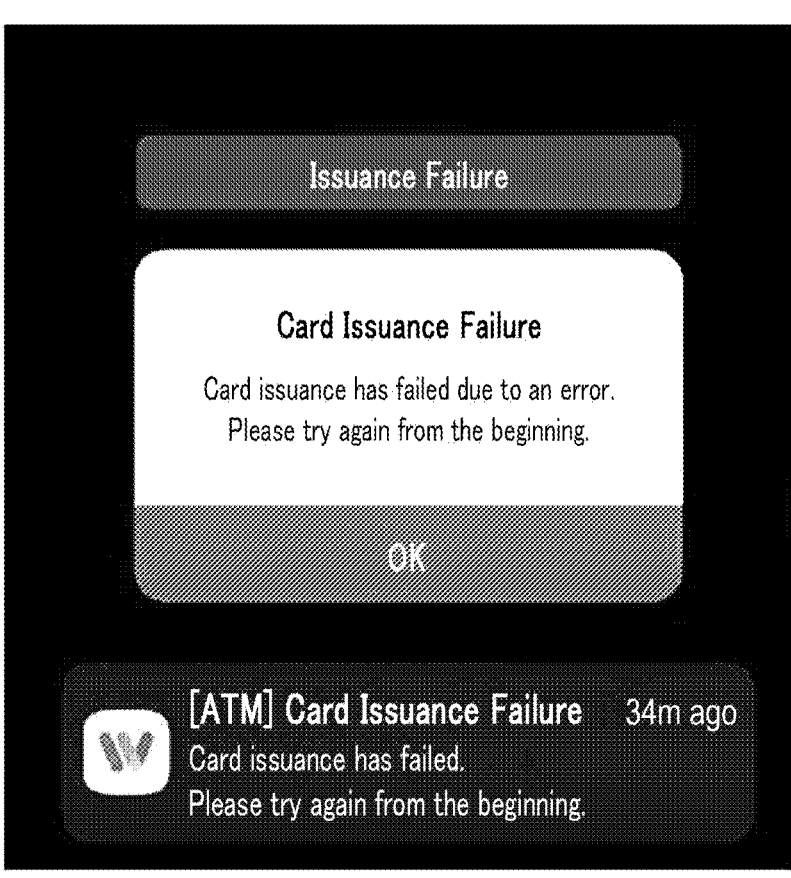
FIG. 3I is a diagram illustrating an example of a screen for indicating a failure of card issuance of an electronic device according to an embodiment of the present disclosure.

FIG. 2 is a flowchart illustrating a method for controlling card issuance of a card issuance system according to an embodiment of the present disclosure, FIG. 3A is a diagram illustrating an example of an initial screen of a card issuing apparatus according to an embodiment of the present disclosure, FIG. 3B is a diagram illustrating an example of a screen for providing an authentication code of a card issuing apparatus according to an embodiment of the present disclosure, FIG. 3C is a diagram illustrating an example of a screen for indicating a verification completion of an electronic device according to an embodiment of the present disclosure, FIG. 3D is a diagram illustrating an example of a screen for indicating that a card is being issued by a card issuing apparatus according to an embodiment of the present disclosure, FIG. 3E is a diagram illustrating an example of a screen for providing issued card information of a card issuing apparatus according to an embodiment of the present disclosure, FIG. 3F is a diagram illustrating an example of a screen for indicating a completion of card issuance of a card issuing apparatus according to an embodiment of the present disclosure, FIG. 3G is a diagram illustrating an example of a screen for indicating a completion of card issuance of an electronic device according to an embodiment of the present disclosure, FIG. 3H is a diagram illustrating an example of a screen for indicating a non-retrieval of an issued card of an electronic device according to an embodiment of the present disclosure, and FIG. 3I is a diagram illustrating an example of a screen for indicating a failure of card issuance of an electronic device according to an embodiment of the present disclosure.

Referring to FIGS. 2 to 3I, a method for controlling card issuance of a card issuance system (hereinafter, card issuance method) according to an embodiment of the present disclosure may include a step (S201) of applying for card issuance. For example, a user who wants to have a card (e.g., a physical card) issued through a card issuing apparatus 300 may apply for card issuance to a card management server 100 through an electronic device 200. Specifically, the user may apply for card issuance through a payment service app or a web browser installed on the electronic device 200. Meanwhile, although not illustrated in FIG. 2, the card issuance method may further include a step of the card management server 100 storing the card issuance application details of users. The card issuance application details may be used later for authentication during card issuance through the card issuing apparatus 300.

The card issuance method may include a step (S203) in which a card issuance request is input. For example, the user may, on the initial screen of the card issuing apparatus 300 illustrated in FIG. 3A, input a card issuance request to the card issuing apparatus 300 by selecting (e.g., touching) a card issuance menu 301 from among various menus.

The card issuance method may include steps (S205, S207) of requesting authentication data. For example, the card issuing apparatus 300 may transmit (S205) a request for authentication data to an issuing apparatus management server 400, and the issuing apparatus management server 400 may transmit (S207) the request for authentication data to the card management server 100 (e.g., a card issuance server 120). In other words, the card issuing apparatus 300 may, in response to the input of the card issuance request, request authentication data from the card management server 100 via the issuing apparatus management server 400. Meanwhile, the card issuing apparatus 300 may, when requesting the authentication data, transmit its identification code together.

The card issuance method may include steps (S209, S211) of receiving authentication data. For example, the card management server 100 may generate authentication data in response to the request for the authentication data, transmit (S209) the generated authentication data to the issuing apparatus management server 400, and the issuing apparatus management server 400 may transmit (S211) the authentication data transmitted from the card management server 100 to the card issuing apparatus 300. In other words, the card issuing apparatus 300 may receive authentication data from the card management server 100 via the issuing apparatus management server 400. Meanwhile, the authentication data that the card management server 100 transmits to the card issuing apparatus 300 may include the identification code, an authentication number, an expiration time, and address information (e.g., a URL).

According to some embodiments, the card issuance method may include a step (S210) of storing the authentication request. The step S210 may be omitted.

The card issuance method may include a step (S213) of generating and outputting an authentication code. For example, the card issuing apparatus 300 may generate an authentication code (e.g., a QR code) based on the received authentication data, and output (e.g., display) the generated authentication code on a display. Specifically, as illustrated in FIG. 3B, the card issuing apparatus 300 may output an authentication code 302, a validity time 303 based on the expiration time, and a guidance message 304 providing usage instructions on the display. In addition, the card issuing apparatus 300 may further display a menu 305 on the display for proceeding to the next step after the recognition of the authentication code and the completion of verification for card issuance.

The card issuance method may include a step (S215) of recognizing the authentication code. For example, when the user activates the camera of the electronic device 200 according to the guidance message 304, the electronic device 200 may recognize the authentication code through a preview image (or a captured image) of the authentication code displayed on the display of the card issuing apparatus 300. At this time, the electronic device 200 may extract the authentication number and the identification code from the recognized code. Meanwhile, the card issuance method may further include a step of the electronic device performing user authentication in response to the recognition of the authentication code. The user authentication may be performed through various known methods (e.g., text message authentication, card authentication, use of a third-party authentication service, etc.).

The card issuance method may include a step (S217) of requesting verification for card issuance. For example, the electronic device 200 may, in response to the completion of the authentication code recognition (and user authentication), transmit a verification request for card issuance to the card management server 100. At this time, the electronic device 200 may transmit the identification code and the authentication number extracted from the recognized authentication code to the card management server 100.

The card issuance method may include a step (S219) of performing verification. For example, the card management server 100 may perform verification to determine if the user is the one who applied for the card issuance. In addition, the card management server 100 may generate issuance data related to the applied—for card, and store the generated issuance data. The card management server 100 may store the issuance data by mapping it with the authentication number and the identification code. The issuance data may include card information (e.g., card number, name, expiration date, payment PIN, security code, etc.). The name may be extracted from the user's account information. Specifically, the payment service server 110 within the card management server 100 receives the verification request (e.g., including the authentication number and the identification code), the payment service server 110 transmits the verification request along with account information to the card issuance server 120, and the card issuance server 120 generates the issuance data and may store it by mapping it with the authentication number and the identification code The card issuance method may include a step (S221) of transmitting a verification result. For example, the card management server 100 may transmit a verification response, which indicates that the verification for card issuance is complete (or successful), to the electronic device 200 as the verification result. Specifically, the card issuance server 120 within the card management server 100 may transmit the verification result to the payment service server 110, and the payment service server 110 may transmit the verification result to the electronic device 200.

The card issuance method may include a step (S223) of displaying a verification completion screen. For example, as illustrated in FIG. 3C, the electronic device 200 may display a verification completion screen. The verification completion screen may include a message 306 requesting an input of a menu 305 on the card issuing apparatus 300 for proceeding to the next step.

The card issuance method may include a step (S225) in which a request to proceed to the next step is input. For example, the user may input a request to proceed to the next step to the card issuing apparatus 300 by selecting (e.g., touching) the menu 305 on the card issuing apparatus 300. According to some embodiments, when the verification for card issuance is completed (or successful) in step S219 (e.g., after storing or transmitting the issuance data), the card management server 100 may transmit a request to proceed to the next step to the card issuing apparatus 300 via the issuing apparatus management server 400. At this time, the verification completion screen may not include the message 306. According to other embodiments, when the request to proceed to the next step is requested from the electronic device 200 instead of the card issuing apparatus 300, the card management server 100 may transmit the request to proceed to the next step to the card issuing apparatus 300 via the issuing apparatus management server 400. At this time, the verification completion screen of the electronic device 200 must include a menu (not illustrated) for requesting to proceed to the next step.

The card issuance method may include steps (S227, S229) of requesting an authentication result. For example, the card issuing apparatus 300 may transmit (S227) a request for the authentication result to the issuing apparatus management server 400, and the issuing apparatus management server 400 may transmit (S229) the request for the authentication result to the card management server 100. In other words, the card issuing apparatus 300 may request an authentication result from the card management server 100 via the issuing apparatus management server 400. Meanwhile, the card issuing apparatus 300 may, when requesting the authentication result, transmit the authentication number and the identification code together.

The card issuance method may include steps (S231, S233) of receiving an authentication result. For example, the card management server 100 may, in response to the request for the authentication result, select issuance authentication data based on the authentication number and the identification code, transmit (S231) the authentication result including the selected issuance authentication data to the issuing apparatus management server 400, and the issuing apparatus management server 400 may transmit (S233) the authentication result transmitted from the card management server 100 to the card issuing apparatus 300. In other words, the card issuing apparatus 300 may receive an authentication result from the card management server 100 via the issuing apparatus management server 400. Meanwhile, the authentication result may include the identification code, the authentication number, and the issuance authentication data.

The card issuance method may include a step (S235) of generating and issuing a card. For example, the card issuing apparatus 300 may generate a card by storing (e.g., writing card information in the memory of an IC chip) and printing card information (e.g., card number, name, expiration date, and security code) included in the issuance data on a pre-stocked provisional card, and issue (e.g., discharge through an outlet) the generated card. Specifically, as illustrated in FIG. 3D, the card issuing apparatus 300 may, while generating the card, display a screen indicating that the card is being issued. In addition, when the card generation is complete, the card issuing apparatus 300 may, as illustrated in FIG. 3E, output a screen for confirming the generated card information (e.g., card type, English name). When a confirm menu 307 is input on the screen of FIG. 3E, the card issuing apparatus 300 may, as illustrated in FIG. 3F, output a screen indicating the completion of card issuance.

The card issuance method may include steps (S237, S239, S241) of transmitting card issuance information. For example, the card issuing apparatus 300 may transmit the card issuance information to the issuing apparatus management server 400, the issuing apparatus management server 400 may transmit the card issuance information to the card management server 100, and the card management server 100 may transmit the card issuance information to the electronic device 200. The card issuance information may include information regarding whether the card issuance is successful.

Specifically, the steps (S237, S239, S241) of transmitting the card issuance information may include, when the card issuance is successful and the issued card is retrieved by the user, the card issuing apparatus 300 transmitting a completion of the card issuance to the card management server 100 via the issuing apparatus management server 400, and the card management server 100 notifying (e.g., by sending a push message) the electronic device 200 of the completion of the card issuance and a request to register the issued card for use. For example, as illustrated in FIG. 3G, the electronic device 200 may output an issuance completion screen.

Meanwhile, the steps (S237, S239, S241) of transmitting the card issuance information may include, when the card issuance was successful but the issued card was not retrieved by the user, the card issuing apparatus 300 transmitting the non-retrieval of the card to the card management server 100 via the issuing apparatus management server 400, and the card management server 100 setting the status of the card to "lost" and notifying (e.g., by sending a push message) the electronic device 200 that the issued card was not retrieved and has been marked as "lost." For example, as illustrated in FIG. 3H, the electronic device 200 may output a screen indicating that the card was marked as "lost" due to non-retrieval.

Meanwhile, although not illustrated in FIG. 2, the card issuance method may further include a step of notifying of a failure of card issuance through the electronic device 200 when the card issuance fails. For example, as illustrated in FIG. 3I, the electronic device 200 may output a screen indicating the issuance failure. Specifically, if an error occurs in some of the steps of FIG. 2 (e.g., the expiration time elapses before step S225 is performed or an authentication failure occurs in steps S227 to S233, etc.) and the card issuance fails, the card issuing apparatus 300 may transmit the failure of the card issuance to the card management server 100 via the issuing apparatus management server 400, and the card management server 100 may notify (e.g., by sending a push message) the electronic device 200 of the failure of the card issuance. As another example, if an error occurs in steps S215 to S221 of FIG. 2, the electronic device 200 may notify of the occurrence of the error (e.g., verification failure) through a pop-up message.

With the aforementioned card issuance method of the present invention, a user can easily and promptly have a card issued through any one of the card issuing apparatuses 300 located nearby after applying for card issuance. In other words, the user convenience for card issuance can be improved. According to some embodiments, the card issuance method may further include a step of the user selecting a card issuing apparatus for card issuance at the time of or after the completion of applying for the card issuance. At this time, the card management server 100 may recommend at least one card issuing apparatus based on the user's location.

Figure 4:
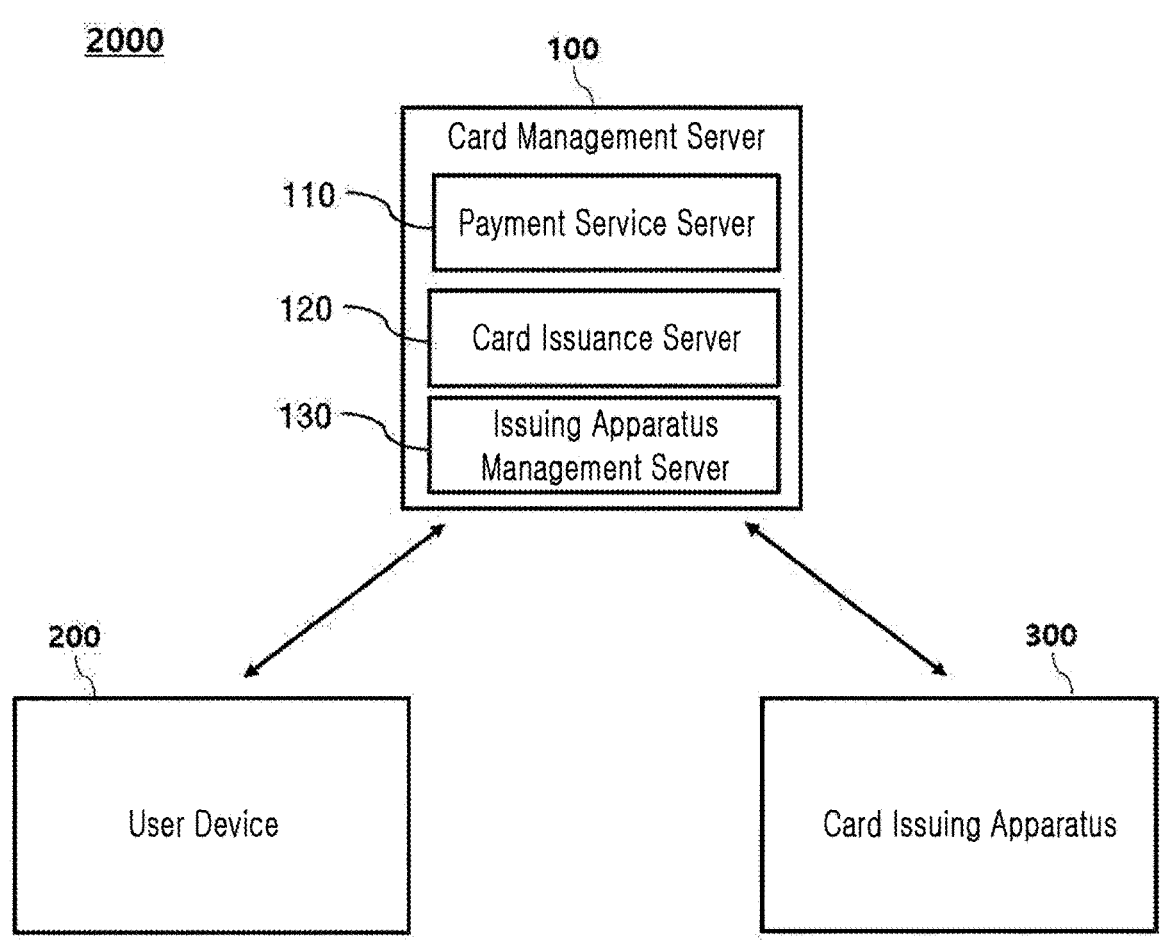
FIG. 4 is a diagram illustrating a configuration of a system for controlling card issuance according to another embodiment of the present disclosure.

FIG. 4 is a diagram illustrating a configuration of a system for controlling card issuance according to another embodiment of the present disclosure.

Referring to FIG. 4, a system for controlling card issuance 2000 according to another embodiment of the present disclosure may include a card management server 100, a user device 200, and a card issuing apparatus 300. In other words, in the card issuance system 2000 of FIG. 4, an issuing apparatus management server 130 may be included in the card management server 100. This is because the company that manages the card issuing apparatus 300 and the company that provides the payment service (e.g., the company that operates the card management server 100) are the same. Except for this difference, the card issuance system 2000 of FIG. 4 is similar to the card issuance system 1000 of FIG. 1. Accordingly, a detailed description thereof will be omitted. According to some embodiments, at least one of the payment service server 110, the card issuance server 120, and the issuing apparatus management server 130 may be integrated.

The various embodiments of the present specification may be implemented as software (e.g., a program) including one or more instructions stored on a machine-readable storage medium (e.g., an internal memory or an external memory). For example, a processor of a machine (e.g., an electronic device) may call at least one of one or more instructions stored from the storage medium and execute it. This enables the machine to be operated to perform at least one function according to the at least one called instruction. The one or more instructions may include code generated by a compiler or code that can be executed by an interpreter. The machine-readable storage medium may be provided in the form of a non-transitory storage medium. Here, 'non-transitory' only means that the storage medium is a tangible device and does not include a signal (e.g., an electromagnetic wave), and this term does not distinguish between cases where data is stored semi-permanently and cases where it is stored temporarily in the storage medium.

A method according to various embodiments of the present specification may be provided included in a computer program product. A computer program product may be transacted between a seller and a buyer as a commodity. A computer program product may be distributed in the form of a machine-readable storage medium (e.g., compact disc read only memory (CD-ROM)), or may be distributed online (e.g., downloaded or uploaded) through an application store (e.g., the Play Store™) (or directly between two user devices (e.g., smartphones)). In the case of online distribution, at least a part of the computer program product may be at least temporarily stored or temporarily generated in a machine-readable storage medium such as a memory of a manufacturer's server, an application store's server, or a relay server.

Although the illustrated embodiments of the present invention have been described with reference to them above, these are merely exemplary, and it will be clearly understood by those of ordinary skill in the art to which the present disclosure belongs that various modifications, changes, and equivalent other embodiments are possible without departing from the gist and scope of the present disclosure. Therefore, the true technical protection scope of the present disclosure should be determined by the technical idea of the appended claims.

What is claimed is:

1. A method for controlling card issuance, the method comprising:
    receiving, by a card management server, from an electronic device of a user, an application for card issuance via a card issuing apparatus;
    in response to an input of a card issuance request at the card issuing apparatus, requesting and receiving, by the card issuing apparatus, authentication data from the card management server via an issuing apparatus management server;
    by the card issuing apparatus, generating an authentication code based on the received authentication data, and displaying the generated authentication code on a display,
    by the electronic device, recognizing the displayed authentication code, transmitting a verification request for the card issuance to the card management server, and receiving a verification result from the card management server;
    in response to a request to proceed to a next step, requesting and receiving, by the card issuing apparatus, an authentication result for the card issuance from the card management server via the issuing apparatus management server; and
    in response to a completion of authentication for the card issuance, by the card issuing apparatus, generating a card by writing and printing card information of the applied for card onto a pre-stocked blank provision card and issuing the card by discharging the generated card through an outlet; and confirming whether the discharged card has been retrieved,
    wherein the requesting and receiving of the authentication data comprises:
    transmitting, by the card issuing apparatus, to the card management server via the issuing apparatus management server, the request for the authentication data along with an identification code of the card issuing apparatus, the identification code comprising geographical location information of the card issuing apparatus; and
    in response to receiving the request, by the card management server, generating the authentication data that includes the identification code comprising the geographical location information of the card issuing apparatus, an authentication number, and an expiration time, and transmitting the generated authentication data to the card issuing apparatus via the issuing apparatus management server.

2. The method of claim 1, further comprising:
    by the electronic device, in response to recognizing the authentication code, performing a user authentication.

3. The method of claim 1
    wherein recognizing the displayed authentication code comprises:

extracting, by the electronic device, the authentication number and the identification code from the authentication code, wherein transmitting the verification request comprises:

transmitting, by the electronic device, the extracted authentication number and the extracted identification code to the card management server, and wherein receiving the verification result comprises:

by the card management server, in response to receiving the verification request, generating issuance data related to the applied-for card, and storing the generated issuance data;

by the card management server, transmitting the verification result for the card issuance to the electronic device; and by the electronic device, receiving the verification result from the card management server.

4. The method of claim 3, further comprising:

by the card management server, after transmitting the verification result, transmitting the request to proceed to the next step to the card issuing apparatus.

5. The method of claim 3, wherein requesting and receiving the authentication result comprises:

by the card issuing apparatus, transmitting the request for the authentication result comprising the authentication number and the identification code to the card management server via the issuing apparatus management server;

by the card management server, in response to receiving the request for the authentication result, selecting issuance data based on the authentication number and the identification code; and by the card management server, transmitting the authentication result comprising the selected issuance data, the authentication number, and the identification code, to the card issuing apparatus via the issuing apparatus management server.

6. The method of claim 1, further comprising:

by the card issuing apparatus, transmitting information regarding whether the card issuance is successful to the card management server via the issuing apparatus management server; and by the card management server, transmitting the information regarding whether the card issuance is successful to the electronic device.

7. The method of claim 6, wherein transmitting the information regarding whether the card issuance is successful comprises: when the card issuance is successful and the issued card is retrieved by the user:

by the card issuing apparatus, transmitting a completion of the card issuance to the card management server via the issuing apparatus management server; and by the card management server, notifying the electronic device of the completion of the card issuance and a request to register the issued card for use.

8. The method of claim 6, wherein transmitting the information regarding whether the card issuance is successful comprises: when the card issuance is successful and the issued card is not retrieved by the user:

by the card issuing apparatus, transmitting the non-retrieval of the issued card to the card management server via the issuing apparatus management server; and by the card management server, setting the issued card as lost, and notifying the electronic device that the issued card was not retrieved and has been marked as lost.

9. The method of claim 1, further comprising:

upon a failure of the card issuance, notifying of the card issuance failure via the electronic device.

10. A system for controlling card issuance, the system comprising:

an electronic device;

a card management server;

a card issuing apparatus; and an issuing apparatus management server, wherein the card management server is configured to:

receive, from the electronic device, an application for card issuance via the card issuing apparatus;

receive, from the card issuing apparatus via the issuing apparatus management server, a request for transmission of authentication data;

transmit the authentication data to the card issuing apparatus via the issuing apparatus management server;

receive, from the electronic device, a verification request for the card issuance;

transmit a verification result to the electronic device;

receive, from the card issuing apparatus via the issuing apparatus management server, a request for transmission of an authentication result for the card issuance; and transmit the authentication result to the card issuing apparatus via the issuing apparatus management server, wherein the card issuing apparatus is configured to:

in response to an input of a card issuance request by a user, request and receive the authentication data from the card management server via the issuing apparatus management server;

generate an authentication code based on the received authentication data, and display the generated authentication code on a display;

in response to a request to proceed to a next step, request and receive the authentication result for the card issuance from the card management server via the issuing apparatus management server; and in response to a completion of authentication for the card issuance, generate a card by writing and printing card information of the applied-for card onto a pre-stocked blank provisional card, and issue the generated card by discharging the generated card through an outlet; and confirming whether the discharged card has been retrieved, and wherein the electronic device is configured to:

transmit, to the card management server, the application for card issuance via the card issuing apparatus;

recognize the authentication code displayed on the card issuing apparatus;

transmit the verification request for the card issuance to the card management server; and receive the verification result from the card management server, wherein the card issuing apparatus is further configured to transmit, to the card management server, the request for the authentication data along with an identification code of the card issuing apparatus, the identification code comprising geographical location information of the card issuing apparatus, and wherein the card management server is further configured to, in response to receiving the request, generate the authentication data that includes the identification code comprising the geographical location information of the card issuing apparatus, an authentication number, and an expiration time, and transmit the generated authentication data to the card issuing apparatus.

11. The system of claim 10, wherein the electronic device is further configured to:

in response to recognizing the authentication code, perform a user authentication.

12. The system of claim 10, wherein the electronic device is configured to:

extract the authentication number and the identification code from the authentication code; and transmit the extracted authentication number and the extracted identification code to the card management server, and wherein the card management server is configured to:

in response to receiving the verification request, generate issuance data related to the applied-for card, and store the generated issuance data; and transmit the verification result to the electronic device.

13. The system of claim 12, wherein the card management server is further configured to:

after transmitting the verification result, transmit the request to proceed to the next step to the card issuing apparatus.

14. The system of claim 12, wherein the card issuing apparatus is configured to:

transmit the request for the authentication result comprising the authentication number and the identification code to the card management server, and wherein the card management server is configured to:

in response to receiving the request for the authentication result, select issuance data based on the authentication number and the identification code; and transmit the authentication result comprising the selected issuance data, the authentication number, and the identification code to the card issuing apparatus.

15. The system of claim 10, wherein the card issuing apparatus is configured to transmit information regarding whether the card issuance is successful to the card management server, and wherein the card management server is configured to transmit the transmitted information regarding whether the card issuance is successful to the electronic device.

16. A method for controlling card issuance, the method comprising:

by a card management server, receiving, from an electronic device of a user, an application for card issuance via a card issuing apparatus;

by the card management server, receiving, from the card issuing apparatus, a request for authentication data required for generating an authentication code, along with an identification code of the card issuing apparatus, the identification code comprising geographical location information of the card issuing apparatus;

by the card management server, generating the authentication data that includes the identification code comprising the geographical location information of the card issuing apparatus, an authentication number, and an expiration time, and transmitting the generated authentication data to the card issuing apparatus;

by the card management server, receiving, from the electronic device, a verification request for card issuance, wherein the card issuance is based on the authentication code displayed on the card issuing apparatus, and wherein the verification request is based on the authentication data;

by the card management server, transmitting a verification result to the electronic device;

by the card management server, receiving, from the card issuing apparatus, a request for transmission of an authentication result for the card issuance;

by the card management server, transmitting the authentication result to the card issuing apparatus;

by the card issuing apparatus, in response to the authentication result, generating a card by writing and printing card information of the applied-for card onto a pre-stocked blank provisional card and issuing the card by discharging the generated card through an outlet; and confirming whether the discharged card has been retrieved; and upon issuance of the generated card by the card issuing apparatus, receiving, by the card management server, from the card issuing apparatus, information regarding whether the card issuance is successful.

* * * * *